(12) United States Patent
Scaglione

(10) Patent No.: US 10,548,303 B2
(45) Date of Patent: Feb. 4, 2020

(54) CRAB TRAP

(71) Applicant: Patrick Scaglione, Staten Island, NY (US)

(72) Inventor: Patrick Scaglione, Staten Island, NY (US)

( * ) Notice: Subject to any disclaimer, the term of this patent is extended or adjusted under 35 U.S.C. 154(b) by 214 days.

(21) Appl. No.: 15/849,792

(22) Filed: Dec. 21, 2017

(65) Prior Publication Data

US 2019/0191679 A1   Jun. 27, 2019

(51) Int. Cl.
*A01K 69/10* (2006.01)
*A01K 69/08* (2006.01)

(52) U.S. Cl.
CPC ............... *A01K 69/10* (2013.01); *A01K 69/08* (2013.01)

(58) Field of Classification Search
CPC .................................. A01K 69/10; A01K 69/08
USPC .......................................................... 43/105
See application file for complete search history.

(56) References Cited

U.S. PATENT DOCUMENTS

| | | | | |
|---|---|---|---|---|
| 1,887,059 A * | 11/1932 | Kraus | ................... | A01K 69/08 43/105 |
| 2,584,643 A * | 2/1952 | Vander Clute | ......... | A01K 69/06 43/105 |
| 2,760,297 A * | 8/1956 | Buyken | .................. | A01K 69/08 43/105 |
| 3,427,742 A * | 2/1969 | Brown | ................... | A01K 69/08 43/100 |
| 3,867,782 A * | 2/1975 | Ortiz | ...................... | A01K 69/08 43/105 |
| 4,030,232 A * | 6/1977 | Niva | ...................... | A01K 69/08 43/105 |
| 4,044,493 A * | 8/1977 | Fox | ......................... | A01K 69/06 43/105 |
| 5,353,541 A * | 10/1994 | Jonason | .................. | A01K 69/10 43/100 |
| 5,625,978 A * | 5/1997 | Streeper | ................. | A01K 69/10 43/102 |
| 6,804,911 B1 * | 10/2004 | Henke | .................... | A01K 69/06 43/100 |
| 9,781,910 B1 * | 10/2017 | Burrell | ................... | A01K 69/08 |
| 2004/0181995 A1 * | 9/2004 | Cheramie | .............. | A01K 69/10 43/105 |
| 2011/0162256 A1 * | 7/2011 | Chen | ...................... | A01K 69/10 43/105 |

(Continued)

FOREIGN PATENT DOCUMENTS

| | | | | |
|---|---|---|---|---|
| CA | 2951946 A1 * | 6/2017 | ............. | A01K 69/08 |
| CA | 2964816 A1 * | 10/2018 | ............. | A01K 69/08 |

(Continued)

*Primary Examiner* — Christopher P Ellis
(74) *Attorney, Agent, or Firm* — Ezra Sutton

(57) ABSTRACT

A collapsible crab trap is provided with a centrally-located bait feeder made of wire mesh material. The trap and bait feeder are movable between a collapsed configuration and an assembled configuration. When in a collapsed configuration, it is easy to store or transport. The centrally-located bait feeder is constructed in such a manner that the crabs cannot remove an entire piece of bait from the bait feeder. Another feature of this crab trap is that the two side panels are weighted along their upper edges to positively open the side panels when on the ocean bed for the catching of crabs. These weighted side panels also provide a stable placement of the crab trap in strong moving currents.

8 Claims, 5 Drawing Sheets

(56) References Cited

U.S. PATENT DOCUMENTS

2017/0231206 A1\* 8/2017 Park ................. A01K 61/95
                                                    43/105
2018/0035653 A1\* 2/2018 Lawrence ............ A01K 80/00
2018/0242566 A1\* 8/2018 Hutchinson .......... A01K 97/02
2019/0061890 A1\* 2/2019 Fiorello ............. B63G 8/001
2019/0098881 A1\* 4/2019 Al-Farhan ........... A01K 73/12

FOREIGN PATENT DOCUMENTS

WO    WO-2007078255 A1 \*  7/2007  ............ A01K 69/10
WO    WO-2010015013 A1 \*  2/2010  ............ A01K 69/08

\* cited by examiner

CRAB TRAP

FIELD OF THE INVENTION

This invention is related to a collapsible crab trap and, more particularly, to a crab trap which has a unique center bait feeder for easy access to supply bait, and weighted side panels to insure the immediate opening of those side panels to catch crabs.

DESCRIPTION OF THE PRIOR ART

U.S. Pat. Nos. 1,968,758 and 1,383,992 are examples of the prior art. A disadvantage of these crab trap designs is in not having a bait feeder cage.

U.S. Pat. No. 4,044,493 is a more recent example of the prior art. However, this patent has the disadvantage of not having a bait housing or bait feeder cage.

OBJECTS OF THE INVENTION

It is the primary object of the present invention to provide a collapsible crab trap which has a unique centrally-located bait feeder with an access door for easy baiting of the trap, and has two side panels that are locked with a U-shaped lock.

It is another object of the present invention to provide a crab trap with weighted side panels to positively insure the immediate opening of those side panels which entices the crabs to enter the trap and feed on the bait in the centrally-located bait feeder.

Another object of this present invention is that the two weighted side panels in their open state and lying on the ocean bed give stability and placement of the crab trap in the ocean bed, thus preventing the crab trap from moving in strong currents.

Still another object of the present invention is that the collapsible crab trap in its present arrangement is very easy to transport, as it has no loose pieces when in its collapsed state. Also, the trap can be assembled in one manual step from a collapsed state to an open state by simply attaching one spring to the side bait panels and top panel of the bait feeder.

SUMMARY OF THE INVENTION

The present invention provides a collapsible crab trap which has a unique centrally-located bait feeder with an access door for easy baiting of the trap. The crab trap has weighted side panels to positively insure the immediate opening of those side panels, so the crabs can enter the trap and feed on the bait in the centrally-located bait feeder. The collapsible crab trap in its present arrangement is very easy to transport, as it has no loose pieces when in its collapsed state. Also, the trap can be assembled in one manual step from a collapsed state to an open state by simply attaching one spring to the side bait panels and top panel of the bait feeder.

DETAILED DESCRIPTION OF THE PREFERRED EMBODIMENT

Figure 1:
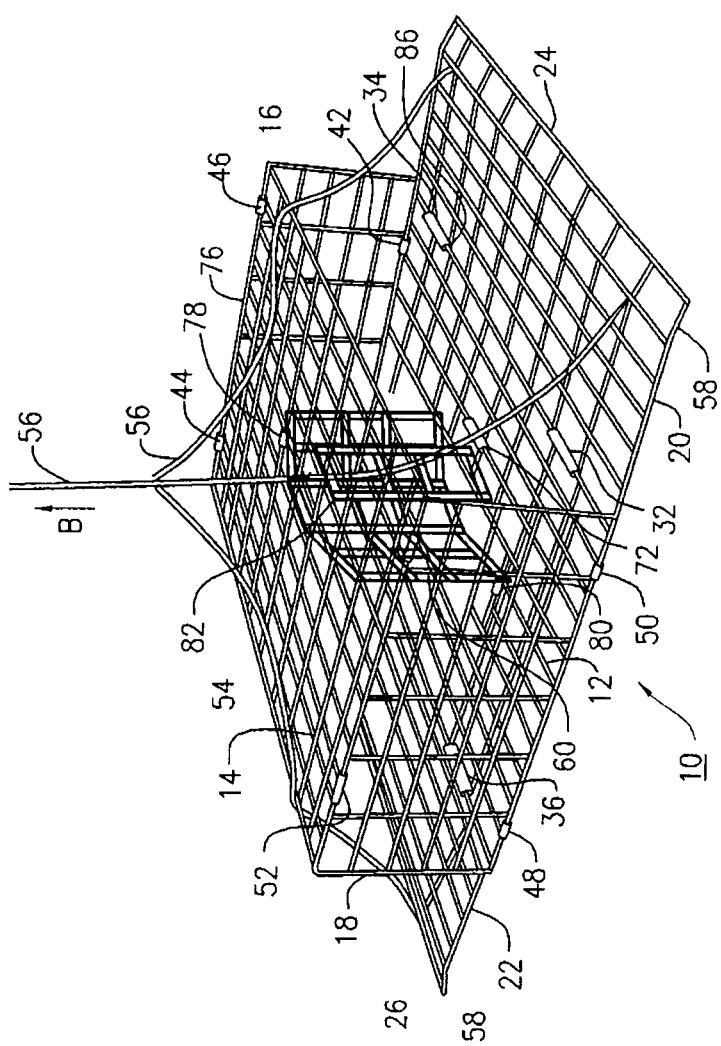
FIG. 1 is a perspective view of the collapsible crap trap of the present invention in an open position and ready to catch crabs.
Figure 2:
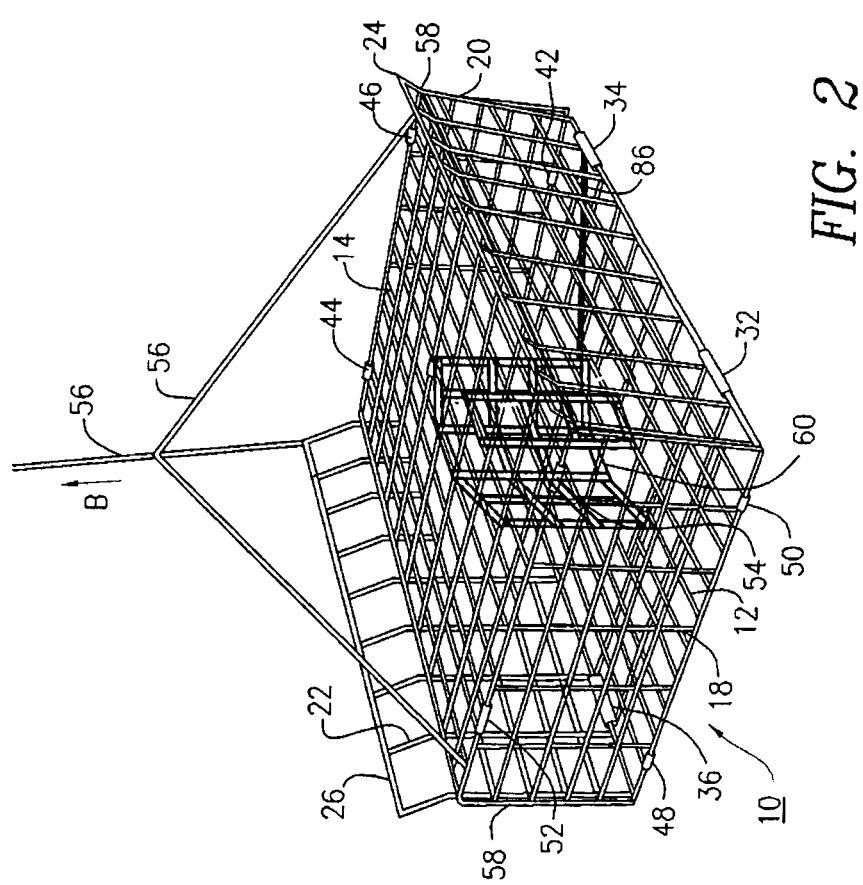
FIG. 2 is a perspective view of the collapsible crab trap of the present invention in a closed position.
Figure 3:
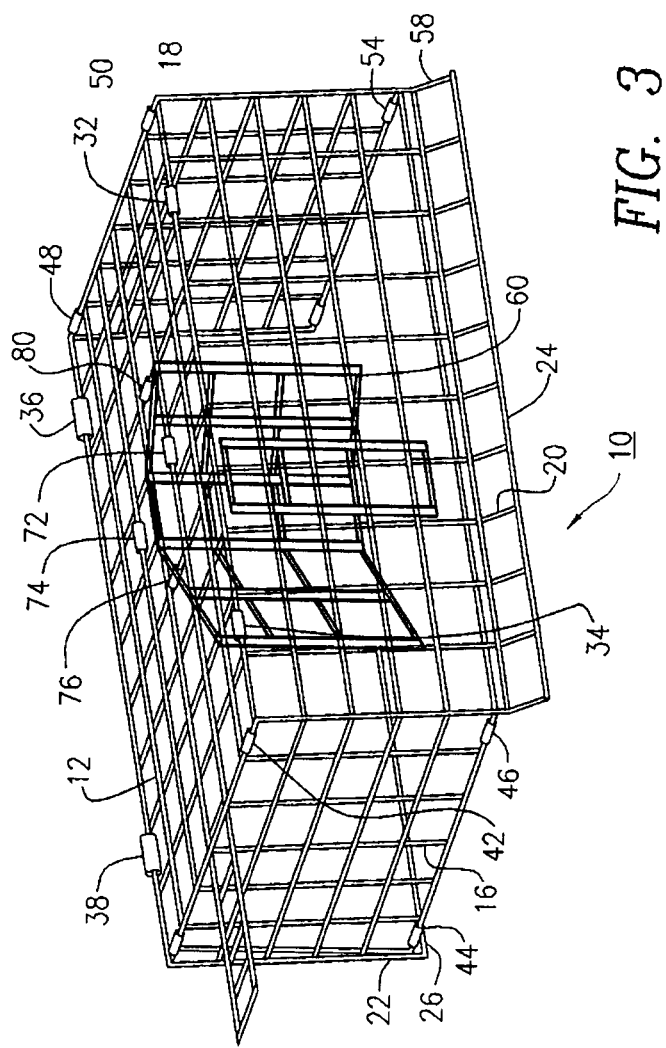
FIG. 3 is a perspective view of the collapsible crab trap of the present invention from a bottom view, with the bait feeder door in the open position and ready to be loaded with bait.

The collapsible crab trap 10 and the centrally-located bait feeder 60 are made of wire mesh material, as shown in the drawings. FIG. 1 shows the crab trap 10 in the open position, and FIG. 2 shows the crab trap 10 in the closed position. FIG. 3 shows the crab trap 10 from a bottom perspective, emphasizing the centrally-located bait feeder 60, with the bait feeder bottom door 62 in the open position. Crab trap 10 is movable between a collapsed configuration, to a partially collapsed position, as shown in FIG. 5, to a fully-assembled position, as shown in FIGS. 1 through 4. The center bait feeder 60 is shown from a bottom view in FIG. 4, with the bait feeder door 62 in a closed position. A latch spring or other suitable closure may be used for securing the bait feeder door 62 in the closed position.

The crab trap 10 is shown in the assembled configuration in FIGS. 1 and 2. The crab trap 10 comprises a bottom panel 12 made of wire mesh material; a top panel 14 made of wire mesh material; two end panels 16 (right side) and 18 (left side) made of wire mesh material movably connecting the top and bottom panels 12 and 14; and two side panels 20 (right side) and 22 (left side) made of wire mesh material, each pivotally connected to opposite side edges of the bottom panel 12.

Side panels 20 and 22 each have heavier gauge wire mesh in the upper rods 24 and 26, respectively. These upper heavier wire mesh rods 24 and 26 are preferably 9 gauge in thickness and weigh approximately 2 ounces each, while the rest of the trap is made of lighter weight 14 gauge wire mesh. The wire mesh material is galvanized to prevent salt water corrosion and rusting. Because the side panels 24 and 26 are weighted along their upper edges, they positively open when disposed in the water for catching crabs.

FIG. 5 shows tubular hinge clips 32 and 34 pivotally connecting right side panel 20 and bottom panel 12. Tubular hinge clips 36 and 38 pivotally connect left side panel 22 and bottom panel 12. FIG. 5 also shows the tubular hinge clips 40, 42, 44, and 46 movably connecting right end panel 16 to the bottom and top panels along with the tubular hinge clips 48, 50, 52, and 54 movably connecting left end panel 18 to the bottom and top panels 12 and 14.

Figure 4:
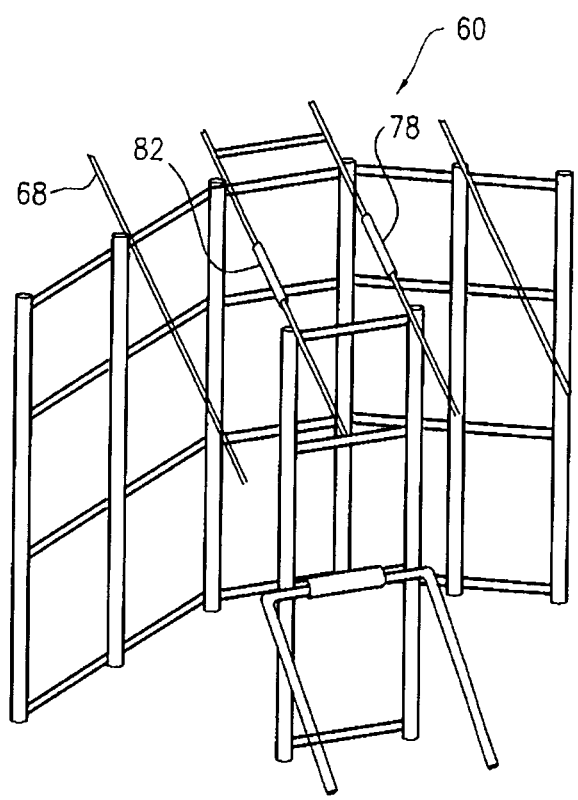
FIG. 4 is a perspective view of the collapsible bait feeder, with the bait feeder door on the bottom.
Figure 5:
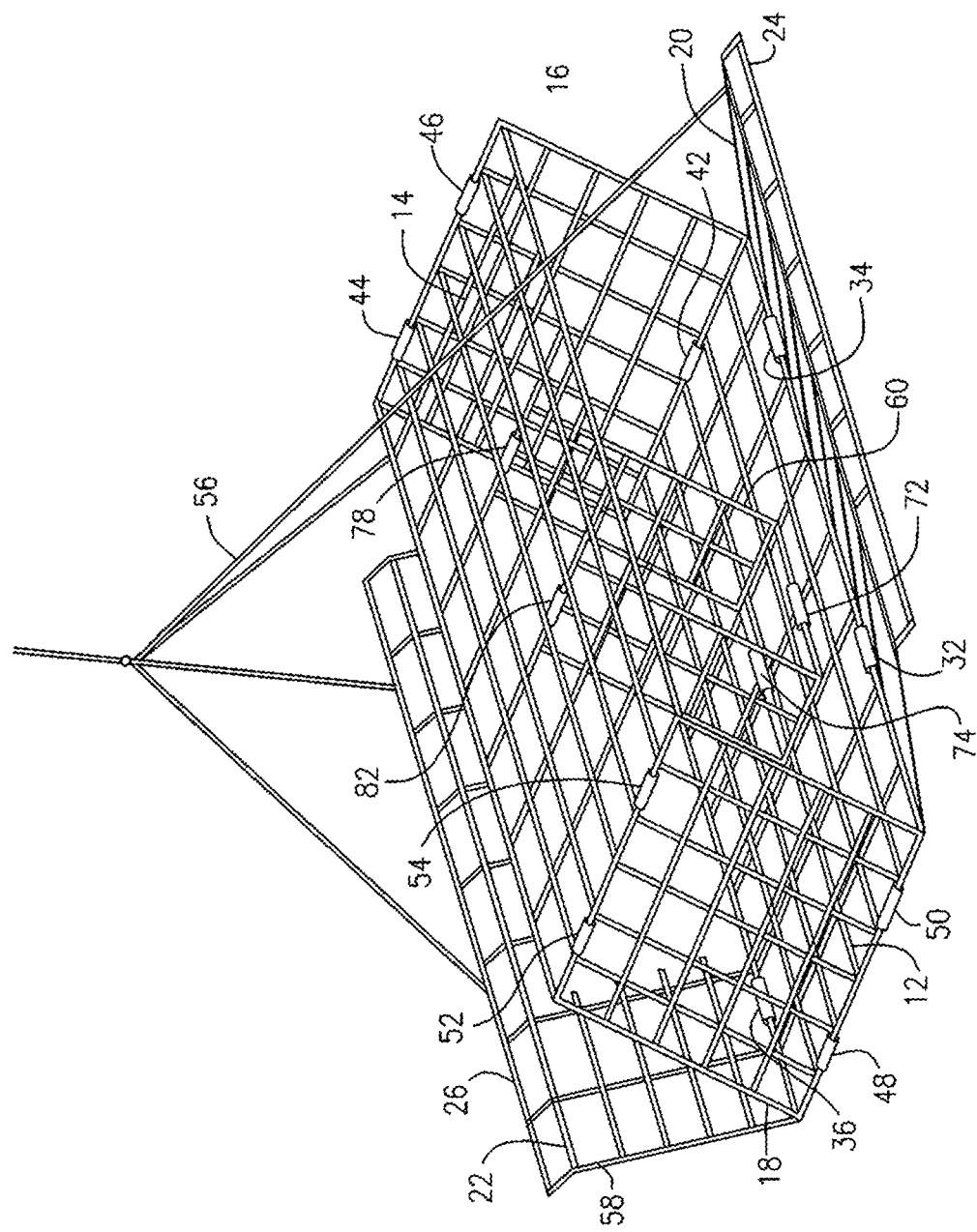
FIG. 5 is a partially-collapsed view of the collapsible crab trap showing the hinging aspect of the top and bottom panels relative to the side and end panels, so that the crab trap may be fully collapsed into a substantially-flat configuration.

As shown in FIGS. 3 and 4, the bait feeder 60 is in the assembled configuration, and the bait feeder 60 is disposed within the center of crab trap 10. The bait feeder apparatus 60 is made of wire mesh material and has two end panels 64 and 66 movably connected to the bottom and top panels 12 and 14, respectively; also, two side panels 68 and 70 each pivotally connected to the bottom panel member 12; and a bait feeder access door 62, which is pivotally connected to the bottom panel member 12, which may be latched thereto for closure. When the side panels 68 and 70 are closed, they are locked into place by using a pivotally mounted novel U-shaped lock 90. The bait feeder 60 also has an opening in the bottom panel member 12 for securely receiving the bait therein. The bait door 62 is held in a closed position with a latch spring with S hooks or similar closure devices. Preferably, the bait feeder 60 is assembled and held in an open configuration by the securing of a latch spring with S hooks to the two side bait panels 68 and 70 through the top panel member 14, thus giving the bait feeder 60 a rigid form.

In FIG. 4, the drawing shows tubular hinge clips 72 and 74 that pivotally connect the two side bait feeder panels 68 and 70 to the bottom panel member 12. FIG. 4 also shows the tubular hinge clips 76 and 78 and tubular hinge clips 80 and 82 that pivotally connect the end bait panels 64 and 66 to the bottom and top panels 12 and 14, respectively. It should be noted the tubular hinge clip 80 movably connects the bait feeder door 62 to bottom panel member 12.

ADVANTAGES OF THE PRESENT INVENTION

The advantages in the operation of the crab trap 10 are that with the use of weighted side panels 20 and 22, the weighted crab trap is lowered into the water to the ocean bed, and when contact with the ocean bed is made, the weighted side panels 20 and 22 will positively open. In conjunction with the above is that the weighted side panels 20 and 22 have a greater height dimension than the bottom-to-top height of the rectangular crab trap 10. This insures that the weighted side panels 20 and 22 do not get stuck in the crab trap 10 when it is in its closed state.

Another advantage is that when the crab trap 10 is in its collapsed configuration, the end panels 16 and 18, side panels 20 and 22, end bait feeder panels 64 and 66, and side bait feeder panels 68 and 70 lie in a plane substantially parallel to the top and bottom panels 14 and 12, respectively. Conversely, when the crab trap 10 is in its assembled configuration, the end panels 16 and 18, side panels 20 and 22, end bait feeder panels 64 and 66, and side bait feeder panels 68 and 70 are substantially perpendicular to the top and bottom panels 14 and 12, respectively.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A crab trap and bait feeder made of mesh material and movable between a collapsed configuration and an assembled configuration, comprising:
   a) a bottom member made of mesh material;
   b) a top member made of mesh material;
   c) two end panels made of mesh material movably connecting said top and bottom members;
   d) two side panels made of mesh material, each pivotally connected to opposite side edges of said bottom member;
   e) each of said two side panels having heavier gauge wire mesh thereon to positively open said side panels when disposed in water for catching crabs;
   f) a bait feeder made of mesh material and disposed within said crab trap and being movably connected to said top and bottom members;
   g) said bait feeder including two movable sidewalls for enclosing bait therein; a U-shaped locking member for holding said movable side walls in a closed position to keep the bait within said bait feeder;
   h) said bait feeder having an access door for loading and unloading bait;
   i) strings connected to said crab trap for operating same; and
   j) said crab trap and bait feeder being movable between a collapsed configuration, wherein said end panels, side panels, and bait feeder sidewalls lie in a plane substantially parallel to said top and bottom members, and an assembled configuration, wherein said end panels, side panels, and bait feeder sidewalls are substantially perpendicular to said top and bottom members.

2. A crab trap and bait feeder in accordance with claim 1, wherein said side panels exceed the height of said end panels to insure that said side panels freely open when disposed in water.

3. A crab trap and bait feeder in accordance with claim 1, wherein each of said side panels have weights on the upper edge thereof to positively open said side panels.

4. A crab trap and bait feeder in accordance with claim 1, wherein said bait feeder includes four sidewalls movably connected relative to said top and bottom members.

5. A crab trap and bait feeder in accordance with claim 1, wherein the top member of said crab trap forms the top closure of said bait feeder.

6. A crab trap and bait feeder in accordance with claim 1, wherein the bottom member of said crab trap has an opening formed therein for access to said bait feeder and wherein said access door is connected to said bottom member for opening and closing said opening in said bottom member.

7. A crab trap and bait feeder in accordance with claim 1, wherein said two side panels are pivotally connected to said bottom member by hinges.

8. A crab trap and bait feeder in accordance with claim 1, wherein said access door is coextensive with one of said top and bottom members.

\* \* \* \* \*